United States Patent [19]
Mela

[11] Patent Number: 5,086,507
[45] Date of Patent: Feb. 4, 1992

[54] DROP CHANNEL PRE-ALERT FOR TRUNKED RADIO COMMUNICATION SYSTEM

[75] Inventor: Samuel S. Mela, Lynchburg, Va.

[73] Assignee: Ericsson GE Mobile Communications Inc., Lynchburg, Va.

[21] Appl. No.: 356,353

[22] Filed: May 25, 1989

[51] Int. Cl.$^5$ .......................... H04Q 7/00; H04Q 9/00
[52] U.S. Cl. ........................................ 455/34; 455/54; 379/63
[58] Field of Search .................... 455/32, 33, 34, 54, 455/38; 379/58, 59, 60, 63; 370/92-93

[56] References Cited
U.S. PATENT DOCUMENTS

| | | | |
|---|---|---|---|
| 2,897,274 | 7/1959 | Forbes . | |
| 3,898,390 | 8/1975 | Wells et al. | 455/33 |
| 4,012,597 | 3/1977 | Lynk, Jr. et al. | 455/53 |
| 4,347,625 | 8/1982 | Williams | 455/33 |
| 4,352,183 | 9/1982 | Davis et al. | 371/33 |
| 4,360,927 | 11/1982 | Bowen et al. | 455/54 |
| 4,553,263 | 11/1985 | Smith et al. | 455/54 |
| 4,554,677 | 11/1985 | Smith et al. | 455/54 |
| 4,573,207 | 2/1986 | Smith et al. | 455/54 |
| 4,649,567 | 3/1987 | Childress | 455/54 |
| 4,677,656 | 6/1987 | Burke et al. | 379/63 |
| 4,716,407 | 12/1987 | Borras et al. | 455/32 |
| 4,737,978 | 4/1988 | Burke et al. | 379/60 |
| 4,905,302 | 2/1990 | Childress et al. | 455/54 |
| 4,939,746 | 7/1990 | Childress | 455/54 |

Primary Examiner—Reinhard J. Eisenzopf
Assistant Examiner—Lisa Charouel
Attorney, Agent, or Firm—Nixon & Vanderhye

[57] ABSTRACT

To help prevent call bridging and increase the reliability of channel de-assignment in a trunked radio repeater system, the working channel sends a drop channel "pre-alert" message to on-channel mobile units just before sending the drop channel signal. This "pre-alert" message instructs the mobile units to continue to receive but to not attempt to access the channel by transmitting. The pre-alert message thus makes the overall trunked communications system more forgiving of coincident mobile transmissions during drop channel signalling. Under good signalling conditions there are two possibilities: (1) all mobile units detect the pre-alert, nothing is transmitted to the repeater during the pre-alert message, and a drop channel message is transmitted by the repeater following the pre-alert signal to successfully de-assign the channel; or (2) a mobile unit transmits during the pre-alert to thereby prevent the repeater from ever transmitting the drop channel message but to instead permit all mobile units to stay on the channel and continue communications. Thus, no mobile will attempt channel access during the drop channel message, and either; (a) all mobile units leave the working channel and return to the control channel, or (b) all mobile units remain on the working channel and continue to communicate.

6 Claims, 7 Drawing Sheets

Fig. 5A (REPEATER ROUTINE)

Fig. 5B (REPEATER ROUTINE)

Fig. 6 (MOBILE ROUTINE)

DROP CHANNEL PRE-ALERT FOR TRUNKED RADIO COMMUNICATION SYSTEM

FIELD OF THE INVENTION

This invention relates to trunked radio communications systems, and more specifically to method and apparatus for reliably terminating channel assignments in a message trunked radio communications system. Still more particularly, the invention pertains to method and apparatus for preventing mobile units in a trunked radio communication system from accessing a channel while the channel is being de-assigned.

BACKGROUND AND SUMMARY OF THE INVENTION

In a modern land-mobile trunked radio communication systems, voice channels are temporarily assigned to mobile units on an "as needed" basis. An assigned channel is de-assigned when no longer needed and thus becomes available for re-assignment for another conversation involving different mobile units. Since any particular mobile unit (or mobile unit group) typically requires use of voice channels for only a small percentage of the time, a limited number of RF communications channels can be time shared by a relatively large number of mobile units without degrading access time significantly.

Briefly, in a trunked radio communications system a mobile unit needing to communicate with another station (e.g., one or more other mobile units, a dispatcher, and/or a "landline" telephone party) first "acquires" a trunked communication channel (typically by either requesting and receiving a channel assignment, or by locating and seizing a free channel and then transmitting on the channel, depending upon the type of system involved). During this acquisition process, a central repeater station "assigns" the channel to the calling mobile unit for exclusive use by it and the station(s) it is calling. The central repeater station typically also provides some mechanism for causing the station(s) the calling mobile unit wishes to contact to begin operating on the assigned channel. The repeater typically also prevents other non-called stations from operating on the now-assigned channel (e.g., by simply not authorizing non-called mobile units to operate on the channel in some systems, by "marking" the assigned channel with sub-audible signals which inhibit other mobiles from transmitting on it, etc.). Conversation between the calling mobile unit and the called station(s) can then proceed in privacy over the assigned channel without interference from the transmissions of other stations.

In many system operating modes, an assigned channel supports two-way conversation and remains assigned until the conversation terminates. The calling mobile unit generally makes the first transmission. This transmission is received and regenerated (repeated) by the central repeater station for reception by the called station(s). A called station may then transmit a reply for regeneration by the repeater station and reception by the calling mobile unit (and also by any other called station(s)). The calling mobile unit may then make a further transmission, or some other called station my choose to transmit. This communications exchange over the assigned channel continues until all stations are finished transmitting and the conversation has terminated (at least for a time).

Many adverse effects typically result if the assigned channel is not de-assigned rapidly, efficiently and reliably when—but not before—the conversation has terminated. It is generally not desirable in most systems for an assigned channel to be de-assigned before the conversation has actually terminated—since the conversation may be interrupted as a result. Obtaining a new channel assignment in order to complete a conversation can introduce an undesirable and frustrating delay in many systems. Worse still, there may not be a channel available for assignment if the communications system is heavily loaded and the channel just de-assigned is immediately snatched up for assignment to different users. On the other hand, it is highly desirable to de-assign a channel as rapidly as possible after a conversation has terminated because this makes it possible to rapidly re-assign the channel to other users of a heavily loaded system (thus increasing call throughput, minimizing system access time, and serving more users with the same limited number of communications channels).

In many such trunked communications systems, a so-called "hang time" is used to discriminate between on-going and terminated conversations. There is always some time duration of channel inactivity between transmissions because it generally takes a mobile radio user a moment to depress his "push-to-talk" (PTT) switch in response to the last transmission. Many systems in the prior art activate a timer whenever a transmission terminates (e.g., when loss of carrier is detected). If another station quickly transmits, the timer is reset and the channel remains assigned. However, if the timer times a preset maximum "hang time" duration and still no further transmission is detected, the channel is de-assigned ("dropped") and made available for assignment to other users.

Figure 1:
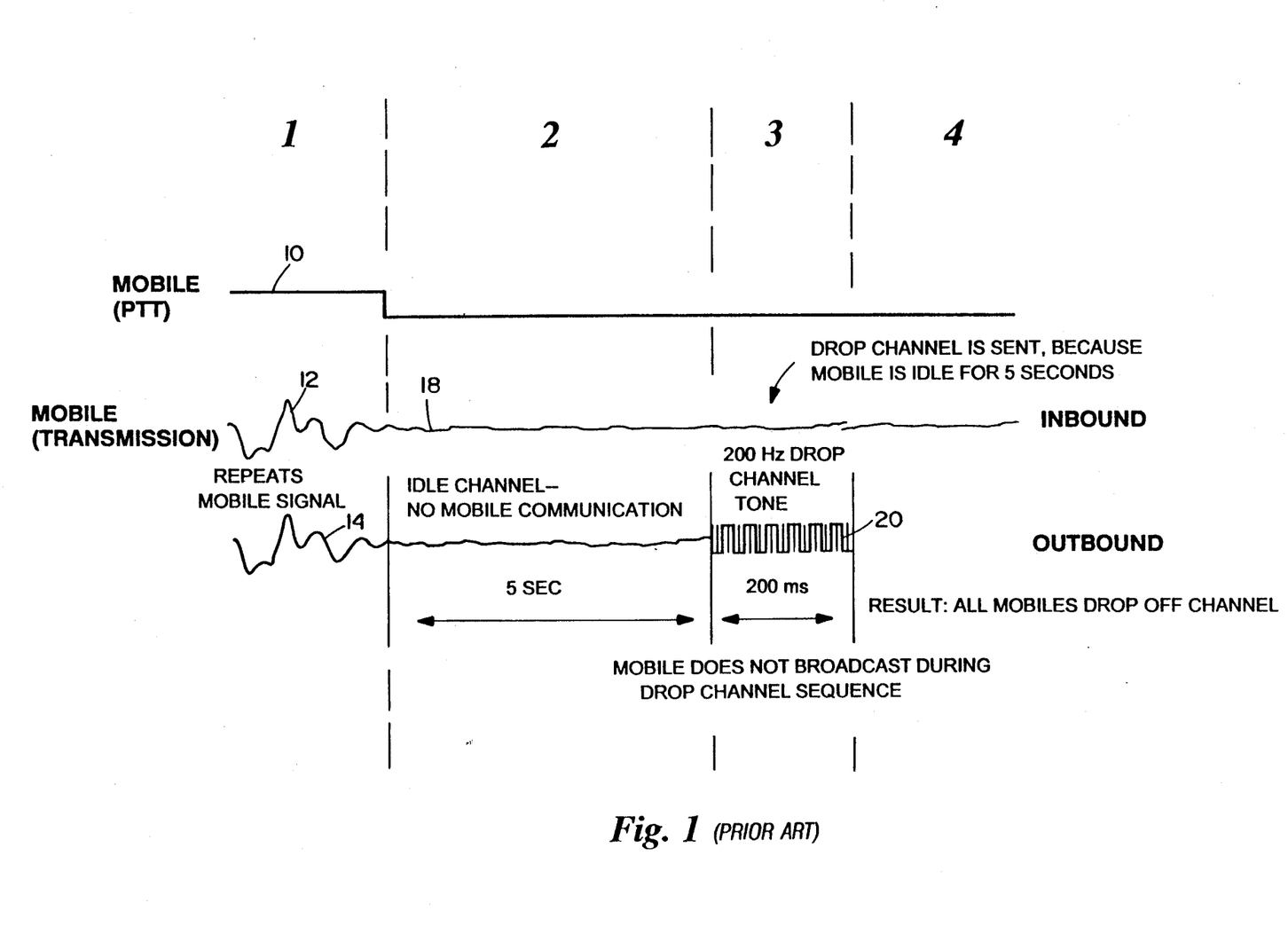
FIG. 1 is a graphical illustration of a "normal" prior art channel de-assignment.

FIG. 1 is a schematic diagram of exemplary "drop channel" signalling in one exemplary prior art narrow band trunked mobile communications system. During time period I, a mobile unit PTT ("push to talk") switch is (continues to be) depressed (as indicated at 10) and its transmitter thus transmits a modulated RF carrier signal (indicated at 12) over the inbound frequency of an assigned duplex RF communications channel (each communications channel typically comprises a pair of RF frequencies: an inbound frequency for carrying RF signals from mobile units in to the central repeater, and an outbound frequency for carrying RF signals from the repeater to the mobile units). The central repeater site "repeats" (e.g., receives and regenerates or retransmits) the mobile transmission on the outbound frequency (indicated at 14).

The mobile unit user releases his PTT switch at the beginning of time period II (indicated at 16), thus causing the mobile unit transmitter to cease transmitting (indicated at 18). Both inbound and outbound channel frequencies are now idle. In the example shown, the repeater detects that the channel has become idle (e.g., by detecting loss of carrier and/or modulated carrier signal on the inbound frequency) at the beginning of time period II and activates a timer. In the example shown, the repeater will not permit a channel to remain idle for more than a 5 second "hang time" and instead de-assigns it for use by other stations when 5 seconds has elapsed with no activity on the channel. Assuming that no other mobile unit on the assigned channel begins transmitting during time period II, the timer soon times the 5 second "hang time" and in time period III the repeater actively de-assigns the channel by transmitting a "drop channel" signal (e.g., a 200 Hz "sub-audible"

tone having a 200 ms duration) on the outbound channel frequency (this tone is indicated at 20).

Assume now that all mobile units operating on the assigned channel correctly receive and decode this "drop channel" tone during time period III. Each mobile unit typically inhibits its transmitter from operating in response to receipt of the "drop channel" tone, and may also take other appropriate action to prepare it for the next call (e.g., shift operating frequency to a "control channel" or other signalling channel to await the next call, resume scanning of channels for a call directed to it, etc.). The channel has thus been successfully de-assigned and may be assigned to other users if necessary.

It may take a good portion of the 200 ms duration of time period III for all mobile units to receive and decode the sub-audible drop channel tone. It takes a finite amount of time for circuitry within the mobile unit to receive and decode the drop channel signal 20. The time required for a tone decoder circuit or the like to decode the drop channel signal tone may be relatively short (e.g., on the order of 50-100 ms or less). However, it is not uncommon for noise or other signal degradation phenomena (e.g., Rayleigh fading) to obscure the drop channel signal and thereby prevent the mobile unit from receiving it until perhaps 50 or 100 ms after time period III begins. Thus, there is a small but not negligible probability that a mobile unit user may key his PTT switch sometime after the repeater has begun to transmit the drop channel signal but before his mobile unit has received and decoded the drop channel signal.

In most commercial systems a mobile unit cannot receive and transmit simultaneously (that is, mobile units are typically only "half duplex" and not "full duplex"). It may thus occasionally happen that a mobile unit begins transmitting just at the time the repeater is transmitting the "drop channel" signal and therefore fails to receive the drop channel signalling entirely. This situation is shown in prior art FIG. 2. Just as shown in FIG. 1, the repeater transmits a "drop channel" signal 20 in time period III. However, suppose a mobile unit user presses his PTT switch to transmit at 22 during transmission of drop channel signal 20 but before his mobile unit has had the time to receive and decode the drop channel signal. The mobile unit user begins talking and his unit begins transmitting a modulated RF carrier signal at 24—but this modulated RF carrier signal is ignored by the repeater since the repeater is already in the process of de-assigning the channel. All other stations operating on the channel receive and successfully decode the drop channel signal, mute their receiver outputs, and cease operating on the channel (as to them, the channel has successfully been de-assigned). Meanwhile, however, the mobile unit transmitting during time period III has failed to receive the drop channel signal 20 altogether because the mobile unit is operating in the transmit mode rather than in the receive mode during time period III and thus cannot "hear" the drop channel signal.

Figure 2:
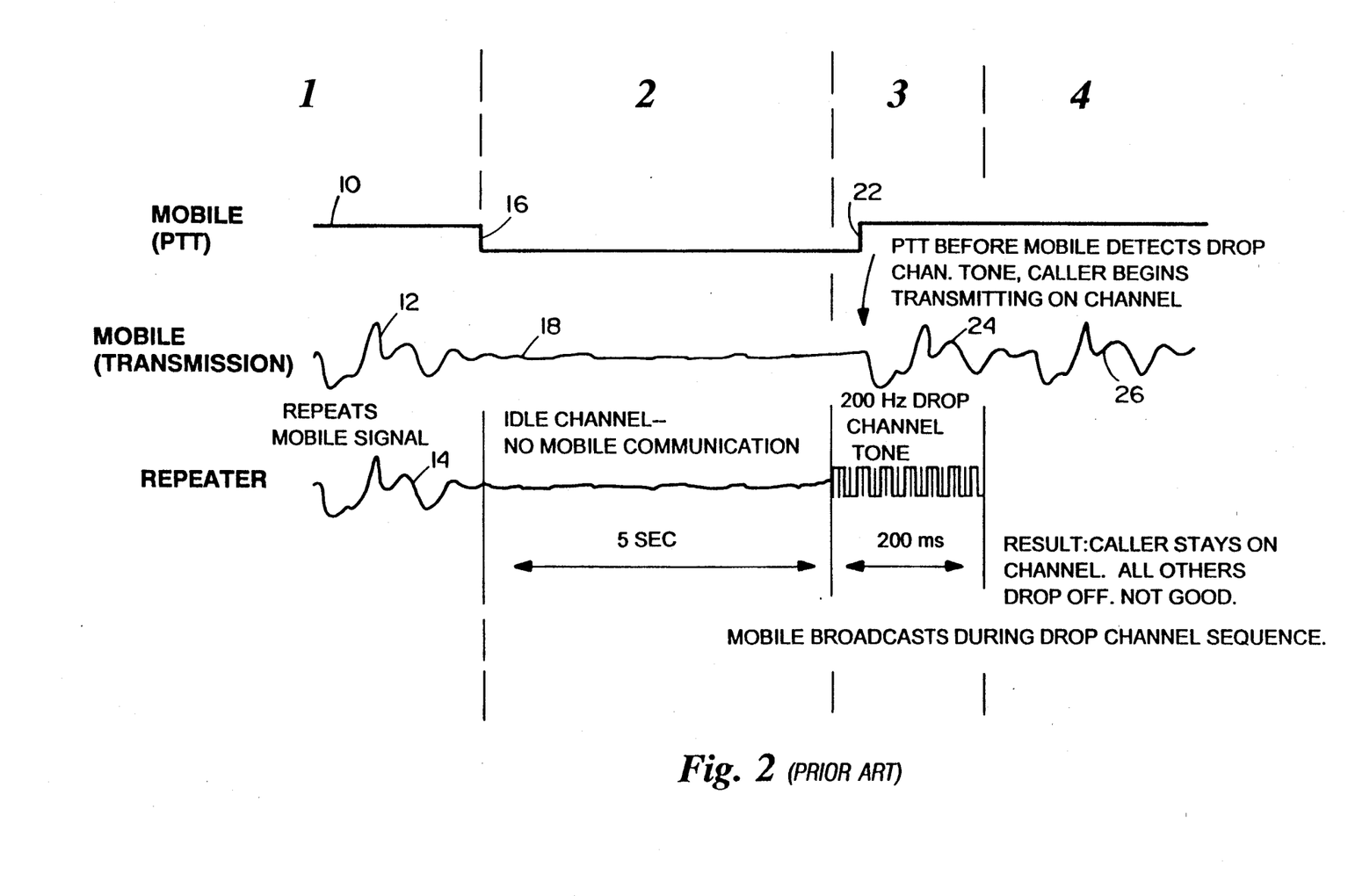
FIG. 2 is a graphical illustration of a faulty prior art channel, de-assignment creating a call bridging problem the present invention solves.

The result is that the transmitting mobile unit remains on the channel with the "mistaken impression" that the channel is still assigned to it and that the other station(s) it was communicating with are also still monitoring the channel.

It is bad enough that the other stations have missed the mobile unit's last transmission and that the mobile unit user has been talking to no one (indicated at 26). Even more disconcerting is that now that the channel has been released it is available for reassignment to another group of stations—and when the mobile user unkeys he may discover himself in the middle of an entirely different conversation (this phenomenon is known as "call bridging") with people he does not know and has no reason to talk to! This latter situation compromises the privacy of the communications system, increases user frustration and confusion, and degrades the overall reliability of communications. Consider, for example, the difficulties that may ensue if a police officer on patrol asks for important information from her dispatcher and unkeys her transceiver only to discover herself in the middle of a conversation between a fleet of garbage trucks or snow plows.

System designers in the past have attempted to avoid this problem by automatically inhibiting a mobile unit from transmitting whenever the mobile unit detects the drop channel signal 20. This solution does not, however, eliminate the problem because there is no way to avoid the finite time required for a mobile unit to receive and detect the drop channel signalling and there is thus always the possibility that the mobile user may key his transmitter after the signalling has been issued but before his transceiver has detected it.

Others in the past have, of course, been concerned about the reliability of channel de-assignment in a trunked radio communications system. The following is a non-exhaustive but perhaps somewhat representative listing of documents relating to trunked radio repeater signalling protocols:

Copending commonly assigned U.S. Pat. application of Childress et al Ser. No. 056,922 filed June 3 1987 now U.S. Pat. No. 4,905,302, issued Feb. 27, 1990;
U.S. Pat. No. 4,553,263, Smith et al
U.S. Pat. No. 3,898,390, Wells et al
U.S. Pat. No. 4,012,597, Lynk, Jr. et al
U.S. Pat. No. 4,716,407, Borras et al
U.S. Pat. No. 4,347,625, Williams
U.S. Pat. No. 4,573,207, Smith et al
U.S. Pat. No. 4,554,677, Smith et al
U.S. Pat. No. 4,649,567, Childress
U.S. Pat. No. 4,352,183, Davis et al
U.S. Pat. No. 2,897,274, E. J. Forbes
U.S. Pat. No. 4,360,927, Bowen et al
U S. Pat. No. 4,677,656, Burke et al
U.S. Pat. No. 4,737,978, Burke et al Of the documents listed above, the Childress et al patent application, the Wells et al patent, and the Smith et al perhaps may be particularly relevant.

The Childress et al U.S. Pat. No. 4,905,302 patent provides a digitally trunked radio repeater system including a particularly advantageous and reliable drop channel signalling sequence. In that system, a drop channel signal comprises an elongated transmission of dotting (alternating 0's and 1's). Dotting can be very rapidly detected by mobile units—and moreover, such dotting detection places such light loading on the mobile radio processor that it can simultaneously detect dotting and a new channel assignment message. If a mobile detects the dotting, it leaves the channel. If it fails to detect the dotting but receives instead a message assigning the channel to a new group, it also leaves the channel. Finally, if the mobile unit is busy transmitting during the entire drop channel/new channel assignment signalling sequence, it will upon unkeying detect that a sub-audible digital signalling field has changed value (the repeater increments this value each time the channel is re-assigned) and immediately leave the channel.

Channel assignment indicators are also transmitted (essentially continuously) on the control channel to provide "late entry" capability.

U.S. Pat. No. 3,898,390 to Wells et al discloses a cellular radio communications signal providing a "15 seconds to terminate" tone at column 29, lines 7–18. In normal operation, a call which has ended (e.g., by a landline user "hanging up" his telephone) is terminated by transmitting a "terminate signal" to the mobile unit. The mobile unit receives the "terminate signal" and de-energizes its transmitter in response. Column 52, lines 37–52. However, the described system also includes a "time-out" feature which limits the maximum duration of a particular call. After a predetermined time period, a "15 seconds to terminate" warning tone is transmitted to both parties to alert them to the fact that they are out of time and that their call is about to be terminated. After 15 seconds have elapsed, the call is automatically terminated if a call terminate signal initiated by one of the parties has not been received.

Smith et al '263 (and the other Smith et al patents listed above as well) also describe a time-out feature. When the repeater assigns a channel to a first group of mobile units, it starts a time-out non-use timer. If no mobile units respond within the time-out period, the repeater transmits an end-of-transmission "TOC" signal as a time-out and muting function thereby revoking the grant of service. If a mobile unit transmitted "DCS" (digital control signal) is not detected by the repeater following the time-out, the repeater solicits request for service from another group of mobile units. If, on the other hand, one of the first group of mobile units transmits a DCS signal, the repeater reassigns the channel to the first group by repeating the incoming DSC code to enable the other mobile units in the first group. See, e.g., column 9, lines 29–38.

None of the arrangements described above solve the problem of how to prevent mobile units from accessing a channel while the channel is being de-assigned or how to guarantee that a channel de-assigned as to some mobile units is de-assigned as to all.

Briefly, the present invention provides a "pre-alert" signal preceding the drop channel signal. This "pre-alert" signal is transmitted by the repeater in the preferred embodiment over a short time duration just prior to transmission of the actual drop channel signal which accomplishes channel de-assignment. Mobile units receiving the "pre-alert" signal inhibit their transmitters automatically to prevent them from transmitting during the drop channel signal which typically immediately follows—but continue to monitor the channel for the drop channel signal and any other signals that the repeater may transmit. Before the repeater actually transmits the drop channel signal, it first determines whether any mobile unit has transmitted during the repeater's transmission of the "pre-alert" signal. If a mobile unit has transmitted during the "pre-alert" signal, the repeater does not transmit the drop channel signal but instead repeats the ongoing mobile transmission. Other mobile units assigned to the channel are continuing to monitor the channel (they have not yet departed because the drop channel signal has not yet been issued) and thus receive the repeated transmission. In one particularly advantageous arrangement, the inhibited mobile units re-enable transmit capabilities in response to the repeated transmission and the repeater restores the channel to assigned status to permit the conversation to continue.

These and other features and advantages of the present invention will be better and more completely understood by referring to the following detailed description of the presently preferred exemplary embodiment in conjunction with the appended sheets of drawings of which:

BRIEF DESCRIPTION OF THE DRAWINGS

FIGS. 5(a–b) are schematic-type flow chart diagrams of exemplary program control steps performed by the repeater and mobile units, respectively provided in accordance with the presently preferred exemplary embodiment of this invention.

DETAILED DESCRIPTION OF A PRESENTLY PREFERRED EXEMPLARY EMBODIMENT

Figure 3:
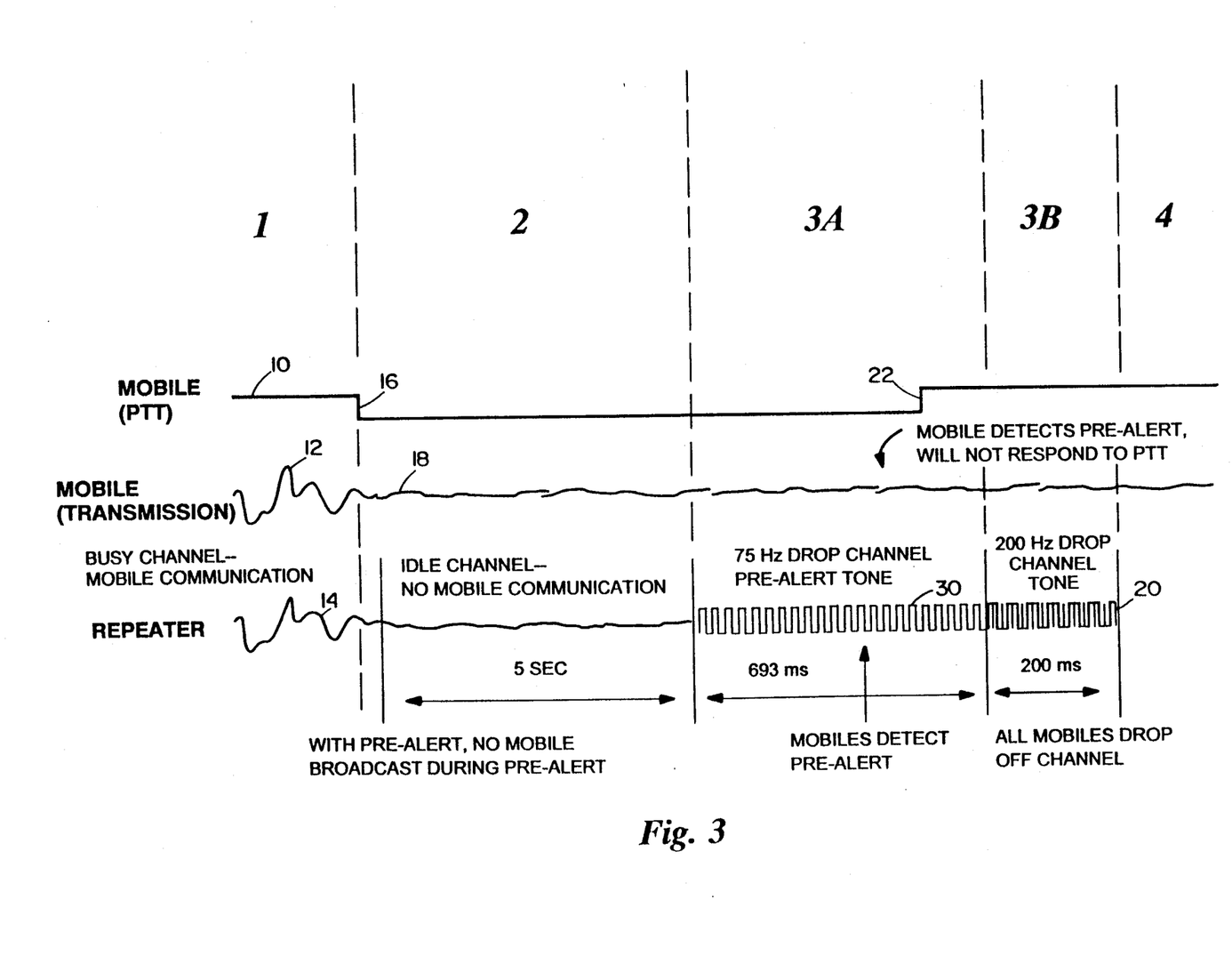
FIGS. 3 and 4 are schematic illustrations of exemplary mobile/repeater signalling exchanges in accordance with the presently preferred exemplary embodiment of the present invention.
Figure 4:
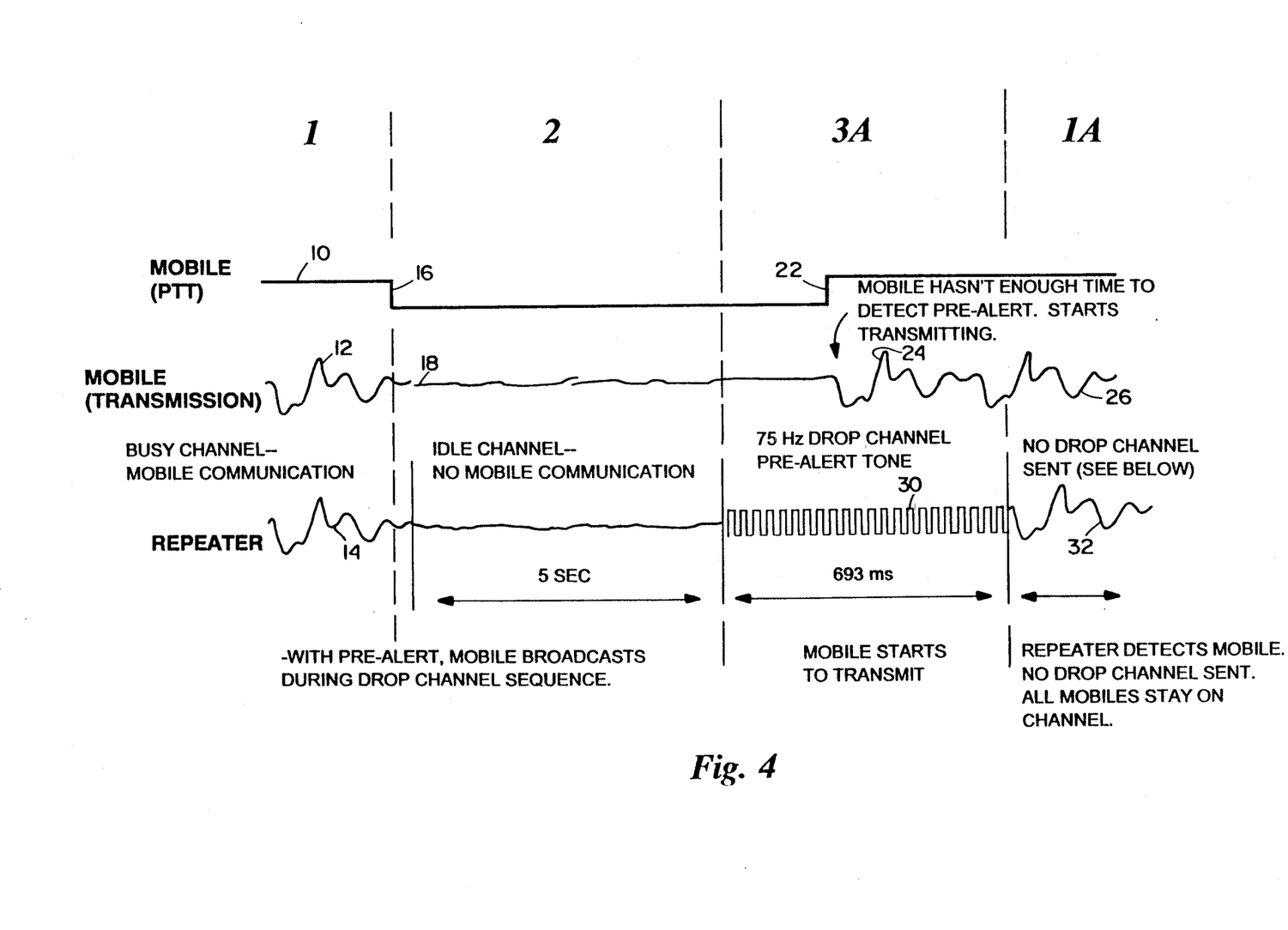

FIGS. 3 and 4 are graphical illustrations of exemplary mobile unit and repeater signalling provided by the presently preferred exemplary embodiment in accordance with the present invention. The preferred embodiment of the invention employs entirely conventional mobile radio and repeater station hardware structures. For example, various different models of digital microprocessor controlled mobile transceivers manufactured and sold by General Electric for a number of years past may be used as mobile units in the preferred embodiment. Such mobile units operate under control of a microprocessor, which in turn performs tasks specified by internally stored program control instructions some exemplary ones of which are described in FIG. 6. Likewise, the preferred embodiment employs a conventional computer-controlled repeater station structure which operates in response to program control instructions exemplary ones of which are shown schematically in FIG. 5.

Figure 5A:
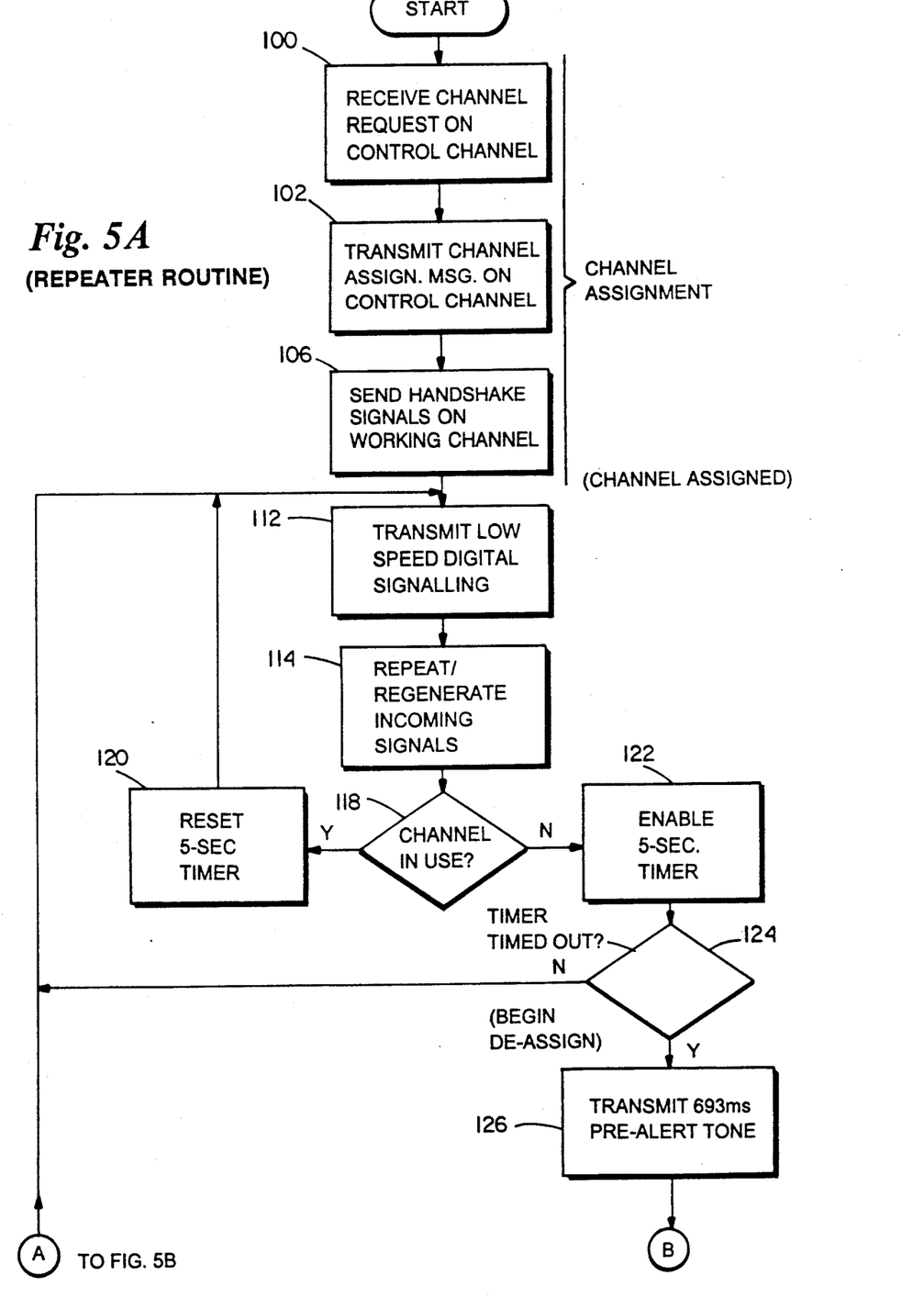
Figure 5B:
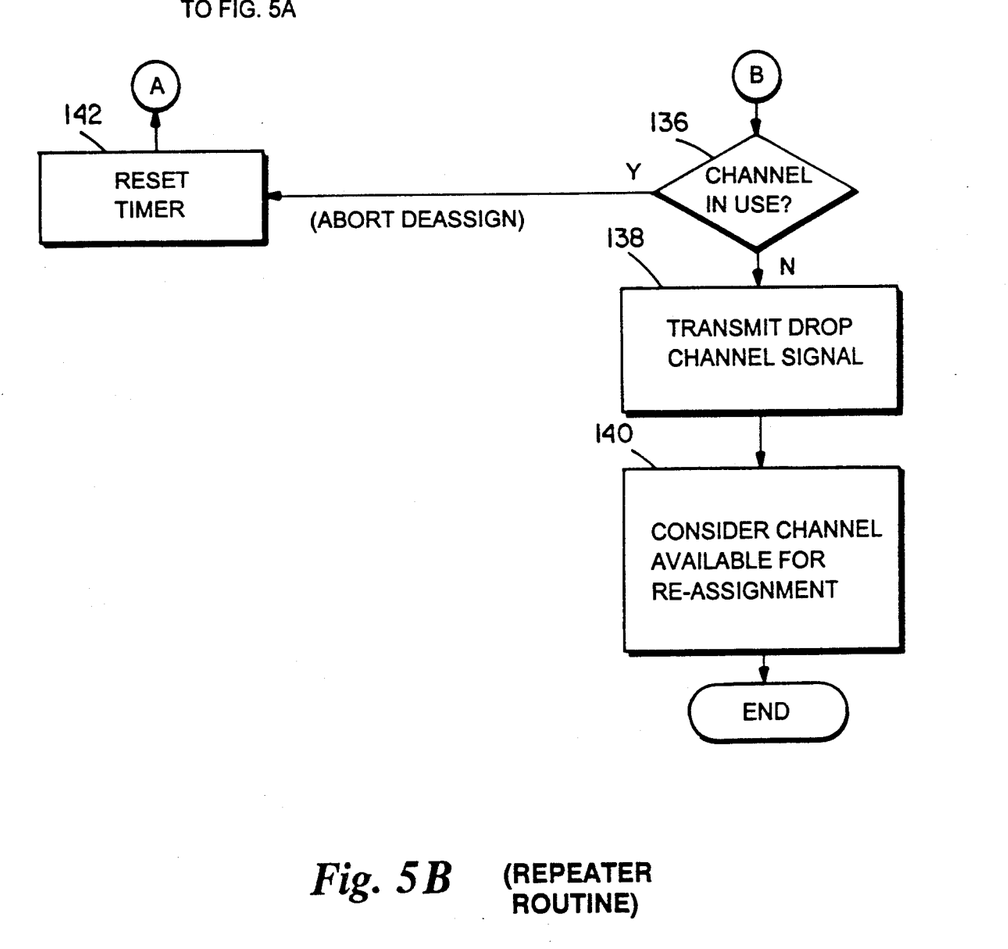
Figure 6:
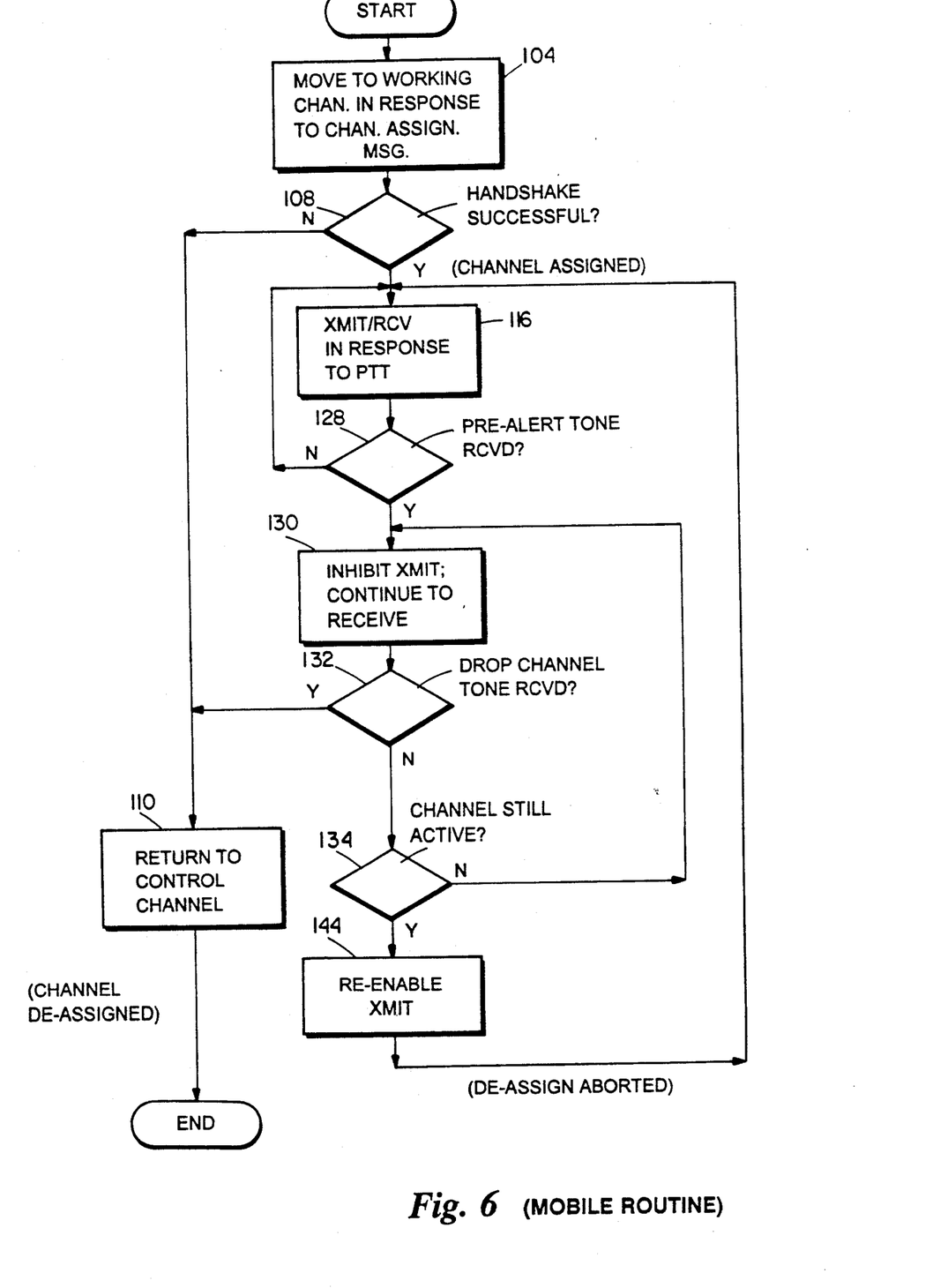

Referring first to FIGS. 5 and 6, assume that a mobile unit requests a communications channel (e.g., by transmitting a channel request message on an inbound digital control channel, this message typically specifying one or more "called" mobile units the calling unit wishes to communicate with). The repeater receives the inbound channel request on the control channel (FIG. 5, block 100), and transmits a responsive channel assignment message on the outbound control channel typically specifying both the "called" mobile units and an unassigned working channel available for use by the calling and called mobile units (FIG. 5, block 102). The calling mobile unit (and also, all called mobile units) receive the transmitted channel assignment message and move to the available working communications channel specified by the repeater in its channel assignment message (FIG. 6, block 104).

Typically, various conventional "handshaking" signals may be exchanged between the mobile units and the repeater over the working channel (FIG. 5, block 106; FIG. 6, block 108) in order to guarantee that the mobile unit(s) have successfully begun operating on the working channel and that the repeater equipment associated with the working channel is functioning properly and is capable of sustaining communications. Also, typically, unsuccessful handshaking directs the mobile units to return to the control channel (FIG. 6, block 110) to give the repeater an opportunity to re-assign the mobiles to a different working channel if necessary.

Assuming the "handshaking" occurs properly, the repeater in the preferred embodiment begins transmitting low-speed subaudible digital signalling packets over the working channel (FIG. 5, block 112, these low-speed digital signalling packets possibly also being used for handshaking functions described above if desired) and repeats and/or regenerates on the outbound control channel all of those mobile-generated voice (or other) signals the repeater receives on the inbound working channel (FIG. 5, block 114). Meanwhile, each mobile unit on the now-assigned working channel transmits whenever its user depresses the PTT button on his microphone (or other similar arrangement) and receives signals present on the outbound working channel whenever it is not in the transmit mode (FIG. 6, block 116). The repeater thus supports two-way conversation between all mobile units operating on the assigned working channel (which conversation may also involve a fixed station dispatcher, a landline caller, etc. as is well known to those of ordinary skill in this art).

The repeater in the preferred embodiment continues to support communications and maintain the working channel in its assigned state until it detects that the working channel has become inactive for a predetermined "hang time". Specifically, the repeater periodically determines whether the working channel is still in use (FIG. 5, decision block 118). This "channel in use" tests may be performed in various different ways depending upon system requirements—as is well known to those skilled in this art. For example, the repeater may determine the absence of a carrier (or modulated RF carrier) on the inbound working channel, or it may detect the absence of subaudible analog or digital signalling transmitted by a mobile unit whenever the mobile unit's transmitter is active. If the repeater detects that the channel is still in use, it resets a 5-second "hang time" timer (FIG. 5, block 120) and continues to transmit low-speed digital signalling and to repeat and/or regenerate inbound signals (FIG. 5, blocks 112,114).

Referring now to FIGS. 3, 5 and 6 together, as soon as the mobile unit unkeys and thus ceases to transmit a signal on the inbound working channel (FIG. 3, reference numerals 16,18), the repeater detects (at FIG. 5, decision block 118) that the working channel is no longer in use and enables the 5-second "hang time" timer to begin timing "hang time" (FIG. 5, block 122). If another (or the same) mobile unit begins transmitting on the inbound working channel before the "hang time" timer times out (as tested for by FIG. 5, decision blocks 118,124), the "hang time" timer is reset (FIG. 5, decision block 118 and block 120) and the working channel remains fully assigned and capable of supporting mobile communications. If, on the other hand, the "hang time" timer times out ("Y" exit of FIG. 5, decision block 124) before the repeater receives any further inbound working channel signals from the mobile unit, the repeater begins the process of de-assigning the working channel. In the prior art, the repeater would simply transmit the "drop channel" tone or signal at this point and immediately de-assign the channel. However, in accordance with an important feature of the present invention, the repeater does not immediately transmit the "drop channel" tone or signal at this point, but instead transmits a "pre-alert tone" or signal (FIG. 5, block 126). This "pre-alert tone" in the preferred embodiment has a duration of 693 ms and in the preferred embodiment comprises a 75 Hz subaudible signalling tone transmitted by the repeater on the outbound working channel (FIG. 3 at 30).

In the preferred embodiment, all mobile units operating on the assigned working channel constantly (or at least periodically) "look for" the pre-alert tone 30 (FIG. 6, decision block 128). The mobile units continue to transmit and receive in response to user PTT switch depressions until they detect pre-alert tone 30 (FIG. 6, blocks 116, 128). Immediately upon receiving the pre-alert tone, a (each) mobile unit inhibits its transmitter but continues to monitor the outbound working channel and to receive all signals present on the outbound working channel (FIG. 6, block 130; FIG. 3, time period IIIA). Once a mobile unit detects pre-alert tone 30 in the preferred embodiment, it ceases to respond to PTT depression (FIG. 3 at 22) since its transmitter is now inhibited from operating. In this inhibited state, however, the mobile unit continues to "listen" for either drop channel tone 20 (FIG. 6, decision block 132) or other (e.g., voice and/or data) signalling on the outbound working channel (FIG. 6, decision block 134).

Assuming that all mobile units operating on the assigned working channel successfully receive and detect the pre-alert tone 30, no mobile unit will generate any additional transmission and the working channel will remain inactive. The repeater in the preferred embodiment monitors the inbound working channel for mobile unit transmissions during the time it transmits the pre-alert tone (FIG. 5, decision block 136) and "listens" for any mobile transmissions. If no mobile transmissions are received on the inbound working channel during the time the repeater transmits the pre-alert tone 30, the repeater transmits drop signal 20 (FIG. 5, block 138; FIG. 3, time period IIIB) and considers the channel to now be reassigned and available for reassignment (FIG. 5, block 140). As soon as a mobile unit receives and detects drop channel tone 20 in the preferred embodiment (FIG. 6, decision block 132), it ceases operating on the working channel and returns to the control channel (FIG. 6, block 110). At this point, no mobile units remain operating on the previously assigned working channel and the working channel is now successfully de-assigned and available for reassignment by the repeater to the other (or the same) mobile units (FIG. 3, time period IV).

Referring now to FIGS. 4–6 together, suppose that a mobile unit user happens to depress his PTT switch in time period IIIA after the repeater begins transmitting pre-alert tone 30. For example, suppose the mobile unit user happened to depress his PTT switch before his mobile unit has had time to detect the pre-alert tone 30; or suppose noise or fading so interferes with the mobile unit reception of the pre-alert tone 30 that the mobile unit 30 has not even received the pre-alert tone before the user depresses PTT. Because the mobile unit has not yet detected pre-alert tone 30 (at FIG. 6, decision block 128), its transmitter is still fully enabled to operate in response to PTT (FIG. 6, block 116) and therefore begins transmitting on the inbound working channel (FIG. 4, time period IIIA at 22,24).

As mentioned previously, the repeater in the preferred embodiment continues to monitor the inbound working channel during the entire time it transmits pre-alert tone 30 (FIG. 5, block 126,136). If the repeater in the preferred embodiment receives a mobile-generated signal on the inbound working channel while it is still transmitting pre-alert tone 30 (FIG. 5, "Y" exit of decision block 136), the repeater aborts the de-assignment entirely, resets the "hang time" timer (FIG. 5, block 142) and once again begins transmitting low-speed digital signalling and repeating and/or regenerating incoming working channel signals (FIG. 5, blocks 112,114). That is, in the preferred embodiment of the present invention, whenever the repeater receives a mobile-generated inbound working channel signal during the transmission of pre-alert tone 30 shown in FIG. 4, time period IIIA, it aborts the de-assignment of the working channel it had previously begun and instead continues to support mobile communications on the working channel.

Meanwhile, all mobile units other than the mobile unit accidentally transmitting during pre-alert tone 30 have successfully received and detected the pre-alert tone and have therefore disabled the respective transmitter sections. Nevertheless, they continue to monitor the outbound working channel for either the drop channel signalling or renewed activity on the channel (FIG. 6, decision blocks 132,134). If the mobile units with inhibited transmitters detect that the outbound working channel is still active (e.g., by disappearance of the pre-alert tone 30 and no appearance of the drop channel signal 20, renewed presence of low-speed digital signalling and/or modulated voice on the outbound working channel) (FIG. 6, decision block 134), the mobiles each re-enable their transmitter sections (FIG. 6, block 144) and once again begin to transmit and receive in response to PTT (FIG. 6, block 116; see FIG. 4, time period IA). These mobile units thus successfully receive the repeated transmission of the mobile unit accidentally transmitting during pre-alert tone 30, and are able to respond to that transmission if desired. The repeater in the preferred embodiment has thus "reset" itself to continue to support communications on the working channel as long as mobile unit operators continue to transmit, and all is as if the repeater did not transmit pre-alert tone 30 or attempt to de-assign the working channel.

In the preferred embodiment, the pre-alert tone 30 duration is selected to be long enough to virtually eliminate the possibility that a mobile unit might transmit at the same time that the repeater issues drop channel tone 20. There is, in the preferred embodiment, an extremely slight possibility that: (a) a mobile unit operating on the working channel might fail to detect (e.g., because of noise, fading, or other adverse propagation conditions) the pre-alert tone 30 until just before the repeater transmits the drop channel tone 20, (b) the mobile unit user depresses PTT and causes his transmitter to begin transmitting at that time, and (c) the repeater is not left with sufficient time to receive and detect this transmission on the inbound working channel and refrain from transmitting the drop channel tone in response to it (thus creating the possibility of call bridging). However, the preferred embodiment uses a pre-alert tone 30 duration that is sufficiently long (e.g., 693 ms) to virtually eliminate this possibility. The duration of Rayleigh fades is substantially shorter than 693 ms and likewise, it is unlikely that spurious noise or other interference will obscure pre-alert tone 30 for most of its 693 ms duration. Accordingly, the extended duration of pre-alert tone 30 in the preferred embodiment all but guarantees that any mobile unit which does accidentally begin transmitting within this time period IIIA shown in FIGS. 3 and 4 will begin transmitting sufficiently prior to the end of the time period to permit the repeater of the preferred embodiment to successfully detect the transmission and abort transmission of the drop channel signal 20 in response. Of course, the duration of pre-alert signal 30 can be increased to further decrease the probability of call bridging at the expense of longer channel de-assignment "overhead" and possibly degraded system channel access time for moderately-to-heavily loaded systems.

In summary, the working channel in the preferred embodiment sends a drop channel "pre-alert" message to the on-channel mobile units just before sending the drop channel tone. This "pre-alert" message instructs the mobile unit to continue to receive but to not attempt to access the channel by transmitting. The pre-alert message thus makes the overall trunked communications system more forgiving of coincident mobile transmissions during drop channel signalling. Under good signalling conditions there are two possibilities:

(1) all mobile units detect the pre-alert, nothing is transmitted to the repeater during the pre-alert message, and a drop channel message is transmitted by the repeater following the pre-alert signal to successfully de-assign the channel; or (2) a mobile unit transmits during the pre-alert to thereby prevent the repeater from ever transmitting the drop channel message but to instead permit all mobile units to stay on the channel and continue communications.

Thus, the pre-alert message in the preferred embodiment guarantees that no mobile will attempt channel access during the drop channel message. Moreover, the signalling provided by the preferred embodiment of the present invention guarantees that either:

(a) all mobile units leave the working channel and return to the control channel, or (b) all mobile units remain on the working channel and continue to communicate. In accordance with the present invention, it is highly unlikely that some but not all of the mobile units will consider the working channel to be de-assigned while one or more mobile units remain on the working channel attempting to communicate.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a trunked radio communications system, a method of operating plural radio frequency transceivers presently assigned for use of a radio frequency communications channel, said method comprising the following steps:

(a) monitoring said assigned channel for a period of non-use by said assigned transceivers and in response to the detection of said period of non-use;

(b) transmitting a pre-alert signal on said assigned channel;

(c) receiving said pre-alert signal present on said assigned radio frequency communications channel at each of said transceivers;

(d) inhibiting further transmission of RF signals over said assigned communications channel by each of said transceivers but with each said transceiver continuing to monitor said assigned channel in response to receipt of said pre-alert signal;

(e) subsequent to said receiving step (c), receiving a drop channel signal present on said assigned channel; and (f) each said transceiver ceasing to monitor said assigned channel in response to receipt of said drop channel signal.

2. A method as in claim 1 wherein said step (f) includes the step of monitoring a further radio frequency communications channel instead of said assigned radio frequency communications channel.

3. A method as in claim 1 wherein said step (f) includes the step of monitoring a radio frequency control channel instead of said assigned radio frequency communications channel.

4. In a trunked radio communications system, a method of operating a radio frequency repeater system comprising the following steps:

(a) assigning an RF communications channel for use by a radio frequency transceiver;

(b) subsequent to said assigning step, commanding said radio frequency transceiver to cease transmitting on said assigned channel;

(c) confirming whether said radio frequency transceiver has ceased to transmit over said assigned channel in response to said commanding step (b);

(d) promptly de-assigning said channel if said confirming step (c) reveals said radio frequency transceiver has ceased to transmit; and (e) continuing to enable said radio frequency transceiver to communicate on said RF communication channel if said conforming step (c) reveals said radio frequency transceiver has not ceased to transmit in response to said commanding step (b).

5. In a trunked radio communications system, a method of operating a radio frequency repeater system comprising the following steps:

(a) assigning an RF communications channel for use by a plurality of radio frequency transceivers;

(b) monitoring said use of said assigned channel by said plurality of radio frequency transceivers;

(c) detecting termination of use of said assigned channel use by said plurality of radio frequency transceivers;

(d) transmitting a pre-alert signal present over said assigned radio frequency communications channel in response to said detected use termination;

(e) subsequent to said transmitting step (d), determining whether any of said plurality of radio frequency transceivers is transmitting over said assigned channel;

(f) de-assigning said channel if said determining step (e) reveals none of said plurality of radio frequency transceivers is transmitting subsequent to said transmitting step (d); and (g) inhibiting said de-assigning step (f) from being performed if said determining step (e) reveals at least one of said plurality of radio transceivers is transmitting.

6. A method as in claim 1 further comprising the steps of:

(g) subsequent to said transmitting step (b) determining whether any of said transceivers is transmitting over said assigned channel, and (h) inhibiting said ceasing step (f) if said determining step (g) detects that at least one of said transceivers is transmitting.

* * * * *